United States Patent [19]

Swinkels et al.

[11] 4,263,164

[45] Apr. 21, 1981

[54] METHOD OF PREPARING A LUMINESCENT ALUMINATE

[75] Inventors: Franciscus J. M. Swinkels; Rudolfus J. C. Bannenberg; Johannes H. A. Schmitz, all of Eindhoven, Netherlands

[73] Assignee: U.S. Philips Corporation, New York, N.Y.

[21] Appl. No.: 75,483

[22] Filed: Sep. 14, 1979

[30] Foreign Application Priority Data

Sep. 20, 1978 [NL] Netherlands .................. 7809555

[51] Int. Cl.$^3$ ............................................. C09K 11/46
[52] U.S. Cl. ............................ 252/301.4 R; 423/263; 423/600
[58] Field of Search ................ 252/301.4 R; 423/263, 423/600

[56] References Cited

U.S. PATENT DOCUMENTS

| | | | |
|---|---|---|---|
| 3,441,512 | 4/1969 | Durkee | 252/301.4 R |
| 4,024,070 | 5/1977 | Schvil | 252/301.4 R |
| 4,096,088 | 6/1978 | Ranby et al. | 252/301.4 R |

FOREIGN PATENT DOCUMENTS

2357811 6/1974 Fed. Rep. of Germany .... 252/301.4 R

OTHER PUBLICATIONS

Tien et al., "J. Electrochem Soc.," vol. 20, No. 2, 1973, pp. 278-281.

*Primary Examiner*—Jack Cooper
*Attorney, Agent, or Firm*—Thomas A. Briody; David R. Treacy; Norman N. Spain

[57] ABSTRACT

In a method of preparing a luminescent aluminate comprising aluminium and one or more of the metals yttrium and elements of the lanthanum series the component metals of the aluminate are co-precipitated from aqueous solutions of salts of these metals by combining these salts with a precipitation agent comprising carbon dioxide and ammonia in a quantity from 1 to 3 mole per mole of carbon dioxide. Such a quantity of the precipitation agent is used that the molar ratio of the carbon in the precipitation agent to the sum of the metals in the salts has a value from 1 to 10, a higher value in that range being chosen for this ratio according as the desired average grain size of the precipitate is larger. Finally, the precipitate obtained is heated at an elevated temperature.

7 Claims, No Drawings

METHOD OF PREPARING A LUMINESCENT ALUMINATE

The invention relates to a method of preparing a luminescent aluminate comprising, besides aluminum, one or more of the metals from the group yttrium and the lanthanum series, the component metals being co-precipitated from aqueous solutions of salts of these metals, whereafter the precipitate thus obtained is separated and heated at an elevated temperature.

The luminescent aluminates which comprise one or more of the metals from the yttrium and the lanthanum series (the elements La to Lu inclusive) as the cation and/or as the activator and further, possibly, other metals such as alkaline earth metals, alkali metals and transition metals as the cations, form an important group of luminescent materials which are used in practice for several purposes. Generally, such aluminates are difficult to manufacture, not only because a solid-state reaction at a relatively high temperature must take place, but also because the starting materials employed must be mixed very carefully. This is necessary to obtain fully formed and properly crystallized aluminates. Furthermore, it often is not quite possible to obtain the desired average grain size and grain size distribution of the final product in a reproducible manner. For practical uses it appears that, in addition to a proper formation and a proper crystallisation of the aluminate, the grain size and the grain size distribution are also important factors in determining whether an efficient luminescence is obtained.

It is generally known that a proper mixing of the starting materials for a luminescent material can be achieved by co-precipitation of the component elements of the luminescent material from solutions.

A method as described in the preamble is disclosed in, for example, Netherlands Patent Application No. 7406960 (PHN 7551), which relates to luminescent aluminates having a garnet structure (for example Ce-activated $Y_3Al_5O_{12}$) and luminescent aluminates having a perovskite structure (for example Ce-activated $YAlO_3$) which are used in cathode-ray tubes for flying spot scanners. The prior art mentioned in this application discloses a preparation method in which yttrium and elements from the lanthanum series are precipitated together with aluminum by means of ammonium hydroxide, ammonium carbonate or ammonium hydrocarbonate. The precipitate thus obtained is very voluminous and jelly-like, so that subsequent processing is very difficult. The said patent application therefore proceeds on different lines and proposes a method based on the use of mixtures of oxides of the component elements and wherein a melting salt is used.

Netherlands Patent Application No. 7214862 (PHN 6604) discloses a great number of very efficiently luminescing aluminates which have a crystal structure related to magneto-plumbite and which are used with great advantage, notably in discharge lamps. Tb-activated cerium magnesium aluminates, Eu-activated barium magnesium aluminates and Ce-activated strontium magnesium aluminates are inter alia described therein. The Patent Application No. 7,014,862 also describes a method of preparing Tb-activated Ce-Mg-aluminate, (Ce, Tb) $MgAl_{11}O_{19}$, wherein ammonium hydroxide is added to a solution of nitrates of Ce, Mg and Al. However, this does not result in an optimal mixing in the precipitate thus obtained, because the Tb is added to the solution as an oxide. Also here a further processing of the precipitate is required to overcome the above-mentioned drawbacks.

According to the invention a method of the type described in the preamble is characterized in that the said salts are combined with a precipitation agent comprising carbon dioxide and, in addition, ammonia in a quantity of 1 to 3 mole of ammonium per mole of carbon dioxide, and that such a quantity of the precipitation agent is used that the molar ratio of the carbon in the precipitation agent to the sum of the metals in the salts has a value from 1 to 10, on the understanding that a higher value in the said range is chosen for this ratio according as the desired average grain size of the precipitate is larger.

Experiments which led to the invention show that a precipitate of the component metals of a luminscent aluminate can be obtained which is easily separated in a customary manner (filtration, centrifugion etc.) from the mother liquid, if a precipitation agent containing carbon dioxide and ammonia is used. However, it is a condition then that a relatively large excess of the precipitation agent is used. It was surprisingly found that not only a properly crystallized and properly processible precipitate is obtained but that also the average grain size of the precipitate can be adjusted, within certain limits, to a desired value. Namely, the greater the excess of precipitation agent is the larger the average grain size of the precipitate becomes. This is a great advantage because at the heating of the precipitate at an elevated temperature which is still required the average grain size remains substantially unchanged. With a method according to the invention it is therefore possible to adjust the average grain size of the final product in a reproducible manner already in the precipitation stage.

The precipitation agent must contain ammonia in a quantity of 1 to 3 mole per mole of carbon dioxide. Ammonia and carbon dioxide can be used as such, but also compounds of these materials may also be used. Preference is given to aqueous ammonium carbonate solutions because these solutions are cheap and easy to handle.

The molar ratio of the carbon in the precipitation agent to the sum of all metals in the used salt solutions must have a value ranging from 1 to 10. Namely, with values of this ratio below unity, jelly-like precipitates are obtained as in the prior art method and at values exceeding 10 the average grain size of the precipitate decreases. Preferably, a value from 3 to 8 is chosen for said molar ratio. The average grain size of the precipitate which can then be achieved is situated in the range from 0.5 to 4 $\mu m$ (based on measurements by means of an instrument which is known as Fisher Sub Sieve Siver (FSSS).

The average grain size obtained at a certain value of said molar ratio is still dependent on the molarity of the salt solutions and of the precipitation agent and, in addition, on process parameters such as temperature, dosing rate and the volume of the reaction vessel.

Preference is given to a method according to the invention wherein a metal chloride solution containing 0.5 to 3 mole of chloride per liter is combined with an aqueous solution of ammonium carbonate which comprises at least 1.5 mole, and preferably at least 3 mole, of carbonate per liter, and wherein the temperature of the solutions during precipitation has a value above 50° C., preferably from 70 to 95° C. The best results are namely obtained in these circumstances.

In a method according to the invention it is efficient to feed the salt solution and the precipitation agent simultaneously and while stirring to a reaction vessel.

A luminescent terbium-activated cerium magnesium aluminate with hexagonal crystal structure is preferably prepared by means of a method according to the invention. These luminescent aluminates have a wide field of usage and can be produced very efficiently on a large scale by means of a method according to the invention.

The invention will now be further explained with reference to a number of examples and tests.

EXAMPLE 1

An aqueous solution containing, per liter, 0.859 mole aluminum chloride, 0.0443 mole cerium chloride, 0.0260 mole terbium chloride and 0.07035 mole magnesium chloride (together 1.00 mole of metal per liter) was made. This solution was supplied at a rate of 100 ml/minute to a reaction vessel (capacity 100 l), containing already 2,5 liter of water and wherein stirring was performed. An aqueous ammonium carbonate solution, containing 3.2 mole $(NH_4)_2CO_3$ per liter was simultaneously supplied to the reaction vessel at a rate of 222 ml/min. Consequently, the molar ratio of the carbon in the precipitation agent to the sum of the metals in the chloride solution (C/Me) had a value of 7.1. The temperature of the solution in the reaction vessel was kept at 80° C.

The precipitate (a mixture of carbonate and hydroxy-carbonates) thus obtained appeared to consist of a properly crystallized powder which allowed easy separation from the mother liquid by means of filtration. The average grain size (FSSS) of the precipitate was 3.60 $\mu m$. After drying, the precipitate was subjected to heating for 10 hours at 250° C. Thereafter the powder was fired twice for 1.5 hour at 1550° C. and once more for 2 hours at 1200° C. The last firing operation was effected in a weakly reducing atmosphere and the other firing operations were effected in air and the product obtained was pulverized and sieved after each firing operation. The product thus obtained was a luminescent terbium-activated cerium magnesium aluminate defined by the formula $Ce_{0.63}Tb_{0.37}MgAl_{11}O_{19}$ and had an average grain size of 3.70 $\mu m$. The luminescent aluminate was applied in low-pressure mercury vapour discharge lamps of the 40 W-type. These lamps furnished an initial luminous flux of 118.6 lm/W. After 100 operating hours the luminous flux was 116.7 lm/W and 112.7 lm/W after 1000 operating hours.

EXAMPLES 2 TO 7 INCLUSIVE

The starting point was a chloride solution containing the same metal chlorides in the same molar ratio as specified in Example 1. However, the total quantity of metal was 1.5 mole per liter. A 3.2 M $(NH_4)_2CO_3$-solution was used again. To check the influence of the molar ratio of carbon to the sum of the metals (C/Me) on the average grain size of the precipitate a precipitation was effected six times. The dosing rate of the chloride solution was each time 35 ml/min. A 10 l-jar which contained 0.5 l of water and wherein stirring was performed was used as the reaction vessel. In these tests the dosing rate of the carbonate solution was readjusted each time to a different value so that the molar ratio C/Me varied. The temperature during precipitation each time was 80° C. A properly crystallized and easily separable precipitate was obtained in all cases. After drying the precipitate obtained was prefired each time at 250° C. and thereafter fired twice during 1.5 hour in air at 1550° C., which yielded a luminescent aluminate defined by the formula given in Example 1.

The following Table shows, for the examples 2 to 7 inclusive: the dosing rate of the carbonate solution (Vc) in ml/min., the molar ratio C/Me, the average grain size (FSSS) of the precipitate (Dp) in $\mu m$, and the average grain size (FSSS) of the aluminate (Dq) in $\mu m$, obtained as the final product.

TABLE

| Example | Vc(ml/min.) | C/Me | Dp ($\mu m$) | Dq($\mu m$) |
|---------|-------------|------|--------------|-------------|
| 2 | 50 | 3,05 | 1,1 | 0.9 |
| 3 | 65 | 4,0 | 1,4 | 1,2 |
| 4 | 82 | 5,0 | 1,8 | 1,8 |
| 5 | 100 | 6,1 | 2,4 | 2,5 |
| 6 | 115 | 7,0 | 2,9 | 3,1 |
| 7 | 130 | 7,9 | 2,9 | 3,0 |

To check the influence of the temperature during precipitation on the average grain size of the precipitate, example 5 was repeated a few times in the same circumstances. However, the temperature of the solution in the reaction vessel was chosen in the range from 50 to 90° C. It appeared that the average grain size of the precipitate varied from approximately 0.7 $\mu m$ (at approximately 50° C.) to approximately 2,6 $\mu m$ (at approximately 90° C.).

To determine the influence of the concentration of the salt solutions on the average particle size of the precipitate, Example 6 was repeated a few times in the same circumstances. However, the quantity of metal per liter was chosen in the range from 0.5 to 3 mole per liter. The ratio C/Me was kept at 7.0. It appeared that the average grain size of the precipitate varied from approximately 3 $\mu m$ (at 0.5 mole of metal per liter) to approximately 1 $\mu m$ (at 3 mole metal per liter).

EXAMPLE 8

In order to prepare a luminescent cerium-activated aluminate defined by the formula $Y_{2.97}CeCe_{0.03}Al_5O_{12}$ (garnet crystal structure) an aqueous solution was made containing 0.625 mole aluminum chloride, 0.37125 mole yttrium chloride and 0.00375 mole cerium chloride per liter (together 1.00 mole). This solution was supplied at a rate of 35 ml/min. to a reaction vessel (capacity 10 l) containing 0.5 l of water and in which stirring was performed. A 3.2 M $(NH_4)_2CO_3$ solution was simultaneously supplied to the reaction vessel at a rate of 30 ml/min. So the molar ratio C/Me had a value of 2.7. During precipitation the temperature in the reaction vessel was kept at 80° C. After having been dried at 80° C. the precipitate obtained appeared to have an average grain size of 0.65 $\mu m$. Heating of this powder at an elevated temperature yields a luminescent aluminate defined by the above-mentioned formula.

EXAMPLE 9

Example 8 was repeated in the same circumstances except for the fact that the flow rate of the $(NH_4)_2CO_3$ solution was adjusted to 97 ml/min. so that the molar ratio C/Me had a value of 8.8. The precipitate obtained could easily be separated by filtering. It appeared that the average grain size of the precipitate dried at 80° C. was 1.8 $\mu m$.

What is claimed is:

1. A method of preparing a luminescent aluminate comprising as a cation at least one metal selected from the group consisting of yttrium and an element selected from those having atomic numbers 57 to 71 inclusive comprising:
   (a) forming an aqueous solution of the chloride salts of the component metals of the aluminate.
   (b) adding a precipitation agent containing ammonium carbonate or carbon dioxide and ammonia in a quantity ranging from 1 to 3 moles of ammonia per mole of carbon dioxide to said aqueous solution in an amount such that the molar ratio of carbon in the ammonium carbonate or carbon dioxide of the precipitation agent to the sum of the metals of the salts has a value of from 3 to 10 to thereby cause said component metals of said aluminate to co-precipitate from said aqueous solution, and
   (c) separating and heating said resultant co-precipitate at a temperature and for a time sufficient to effect the formation of said luminescent aluminate.

2. The method of claim 1 wherein the molar ratio of the carbon to the sum of the metals is 3 to 8.

3. The method of claim 2 wherein the solution of the metal chlorides contains from 0.5 to 3 mols of chloride per liter and an aqueous solution of ammonium carbonate containing at least 1.5 moles of ammonium carbonate per liter is used as the precipitation agent and wherein the temperature of the solutions has a value above 50° to 95° C. during precipitation.

4. The method of claim 3 wherein the solution of the ammonium carbonate contains at least 3 mols of carbonate per liter and the temperature of the solutions during precipitation is from 70° to 95° C.

5. The method of claim 4 wherein the solution of metal chlorides and the solution of the ammonium carbonate are supplied simultaneously with stirring to a reaction vessel.

6. The method of claim 5 wherein aluminum chloride, cerium chloride, terbium chloride and magnesium chloride in an aqueous solution are co-precipitated by the addition thereto of an aqueous solution of ammonium carbonate and the resulting co-precipitate is heated at a temperature and for a time sufficient to effect the formation of a luminescent terbium-activated cerium magnesium aluminate having a hexagonal crystal structure.

7. A method as claimed in claim 1, characterized in that an aqueous ammonium carbonate solution is used as the precipitation agent.

* * * * *